Figure 1:
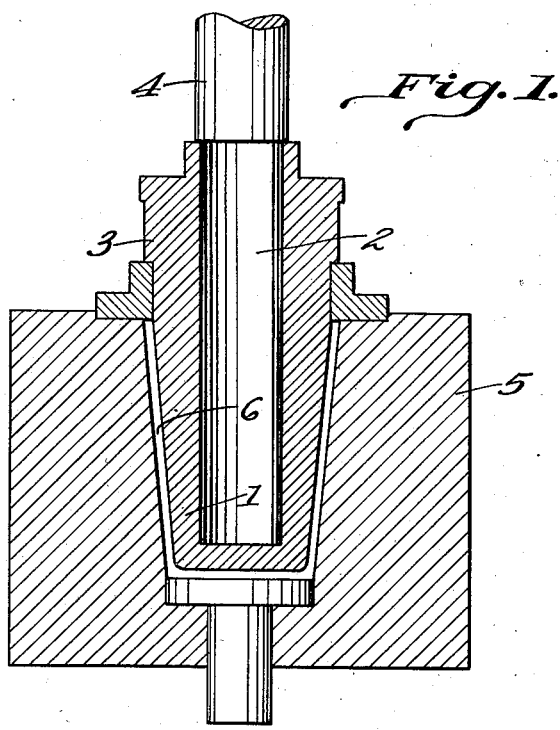

April 2, 1935.  A. W. GREGG ET AL  1,996,152

GLASS MACHINE ALLOY

Filed April 24, 1933

Inventors
Alfred W. Gregg
Raymond H. Frank

By W. S. McDowell
Attorney

Patented Apr. 2, 1935

1,996,152

UNITED STATES PATENT OFFICE 1,996,152

GLASS MACHINE ALLOY

Alfred W. Gregg and Raymond H. Frank, Columbus, Ohio, assignors to The Bonney-Floyd Company, Columbus, Ohio, a corporation of Ohio Application April 24, 1933, Serial No. 667,632

4 Claims. (Cl. 49—65)

This invention relates to the manufacture of an improved metal alloy for use in the formation of metallic appliances employed in glass working machines for handling or molding molten glass into finished articles of glassware. In the manufacture of common glass articles, molten glass is delivered to a metallic mold of desired configuration, and a metallic plunger then enters the mold and spreads the mobile glass throughout the mold spaces formed between the complemental surfaces of the mold body and plunger. The glass then cools to a lower temperature and solidifies and the plunger is withdrawn to provide for the removal of the formed glass article from the mold proper. This operation is carried out ordinarily with the aid of automatic machinery in accordance with modern methods of manufacture. However, there has existed persistent research endeavors to obtain a metal for use in the formation of such plungers or molds having a composition which will withstand to an improved degree the severe conditions of practical operation without being quickly and deleteriously affected by the high temperatures and abrasive action of the operation, also to reduce the formation of imperfect glassware.

Heretofore, these plungers or molds have been formed largely from soft cast iron or in some instances steel alloys, and the glass engaging surfaces thereof have been carefully machined and otherwise treated to present a smooth and polished condition. It will be understood that if these surfaces present very minor imperfections in the form of scale, rust or unevenness, the glassware which contacts therewith is rendered imperfect and unfit for commercial purposes, as it is apt to be streaked, cloudy or striated and does not possess the requisite clear and smooth surfaces and transparency demanded in the finished and trade acceptable commercial article.

The relatively soft cast iron or steel plungers commonly used in such automatic glass article forming machines for pressing the glass gather into a more or less permanent form in a mold, are subjected to what is equivalent to an annealing action by reason of the relatively high temperatures imparted thereto by their contacting with substantially molten glass. This annealing action causes the metals specified to become soft in service, to lose their normal Brinell hardness and as a result may be readily scored through abrasion or otherwise marred to an extent rendering them unfit for the particular service for which they are adapted. The elevated temperatures incident to such operations result in the scaling of ordinary iron and steel plungers due principally, it is believed, to oxidation, causing premature deterioration and shortened effective service. Often such an ordinary plunger can be used for but a few hours of sustained operation in contact with hot glass before surface imperfections develop, after which they must be replaced by new plungers to avoid the production of unsatisfactory glassware. Such replacements necessitate the arresting of the operation of the machine with accompanying loss of glassware production and other delay and expense.

The present invention has, therefore, for its primary object the provision of improved metallic plungers or molds adapted for use in such glass molding machines and wherein said plungers or molds are formed from an improved metallic alloy which, we have discovered, possesses the ability to withstand the deleterious influences and conditions above noted to a far greater degree than previously used irons or alloys of which we now have knowledge. Our improved composition serves the end of improving the quality and appearance of the glass articles formed by such appliances and at the same time admits of greatly extended periods of continuous machine operation, minimizes non-production periods due to plunger and other replacements, and very materially decreases the formation of imperfect rejectable glassware which hitherto has been considered to be inevitably concomitant with the operation of automatic glass producing and molding machinery of the character set forth.

It is another object of the invention to improve the quality and appearance of the glassware produced as a result of the operation of automatic glass forming or molding machines by producing glassware characterized by surface smoothness, freedom from cloudiness and the absence of mold produced imperfections in their surfaces.

It is another object of the invention to provide a glass forming plunger formed from a metal alloy which tends to increase in hardness when subjected to the high temperatures incident to glass molding operations and to offer a high degree of resistance to forces tending to impair the structure of its outer surfaces.

More specifically, our invention consists in a plunger and/or mold made of an alloy metal which by reason of its close grain and hardness will produce a high polish on the glassware formed thereby, will have a long life in service and which tends to increase in hardness when subjected to annealing temperatures and thereby avoiding any substantial softening of the metal when used in glass molding operations.

In the accompanying drawing, the figure is a view partly in side elevation and vertical section of a plunger made in accordance with the present invention.

The plunger comprises, in the particular form thereof illustrated, a metallic body of any suitable external configuration, depending upon the shaft of the glass article to be fashioned thereby. In this instance, the body 1 of the plunger is provided with a liquid circulating passage 2 by means of which a cooling fluid may be passed as usual through the body to prevent overheating thereof. The body may be of a substantially tapered form and has its upper end formed with a collar 3. A stem 4 is connected with the plunger to effect its reciprocation into and out of a mold indicated at 5. In high capacity glass making machines, the mold 5 usually is mounted on a revolving table, not shown, and is moved into registration with a port provided in connection with the outlet of the glass furnace. A gather of molten glass drops into the mold and the latter is then moved into registration with the plunger, which enters the mold as indicated and forces the molten glass into the space 6 formed between the adjoining surfaces of the plunger and mold in order to produce a glass article, such as a drinking tumbler or other receptacle. The plunger is then removed from the mold and the latter advanced to a position where the formed glass article may be removed for annealing or other desired heat treatment.

The present invention is particularly directed, as above stated, to the composition of the plunger and/or mold or to a novel alloy for use in the production of these parts.

Such an alloy can be produced by several different formulas, hereinafter given, all having in common the property of machinability as cast (although with some difficulty) and the further ability to harden to a high degree when annealed. This latter property is necessary for the reason that in the operation of pressing the glass into desired form in a mold, the heat of the glass exerts an annealing influence upon the plunger and mold, and with the use of the customary alloy cast irons and steels, the metal of the plunger becomes soft in service and is then readily scored through corrosion or abrasion or the like and rendered unfit for further use.

We have discovered that an alloy having the desirable characteristics above mentioned may be produced by combining the following ingredients in these proportions:

| | |
|---|---|
| Carbon | 1.12% |
| Chromium | 12.63% |
| Molybdenum | 1.02% |
| Silicon | 1.27% |
| Manganese | .60% |
| Nickel | 3.70% |
| Iron and incidentals | Balance |

The above represents a preferred embodiment but it will be understood that the percentages of ingredients may be varied within the following ranges:

| | |
|---|---|
| Carbon | .60% to 1.75% |
| Chromium | 10.00% to 35.00% |
| Molybdenum | .25% to 5.00% |
| Silicon | .50% to 2.00% |
| Manganese | .50% to 1.00% |
| Nickel | .50% to 5.00% |
| Iron | Balance |

Within the above permissible ranges, better results are obtained with the following proportions:

| | |
|---|---|
| Carbon | .80% to 1.10% |
| Chromium | 12.00% to 15.00% |
| Molybdenum | .75% to 1.25% |
| Silicon | .75% to 1.50% |
| Manganese | .50% to 1.00% |
| Nickel | 2.50% to 4.50% |
| Iron | Balance |

The above formulas are of course subject to some modification without departing from the scope of the invention. For example, 5.00% to 10.00% of tungsten may be added and/or vanadium can be substituted for the molybdenum content.

The alloy set forth produces unusual and wholly unexpected results in the field of service for which it is intended as it was formerly believed that in appliances of this character, the softening of the metal under conditions of high temperature would naturally occur, whereas in the present composition possesses the ability to increase in hardness when subjected to such high temperatures. Thus the alloy is of austenitic or austino-martensitic as cast and transforms or decomposes to the martensitic state after submission to a heating cycle. Thus as cast, the plunger may possess a Brinell hardness of the order of 250 to 255 permitting of its being machined, whereas after annealing, the plunger possesses a hardness of the order of 400 to 500 Brinell.

Cobalt may replace nickel or may be added in addition to the other ingredients.

What is claimed is:

1. Glass molding apparatus which is substantially austenitic as cast and transforms to the martensitic state after submission to a heating cycle and possessing substantially the following composition: carbon 1.12%, chromium 12.63%, molybdenum 1.02%, silicon 1.27%, manganese .60%, nickel 3.70%, iron and incidentals, balance.

2. Glass molding apparatus which is substantially austenitic as cast and transforms to the martensitic state after submission to a heating cycle and containing carbon .80% to 1.12%, chromium 12.00% to 15.00%, molybdenum .75% to 1.25%, silicon .75% to 1.50%, manganese .50% to 1.00%, nickel 2.50% to 4.50%, iron, substantial balance.

3. Glass molding apparatus which is substantially austenitic as cast and transforms to the martensitic state after submission to a heating cycle and possessing substantially the following composition: carbon 1.12%, chromium 12.63%, molybdenum 1.02%, silicon 1.27%, manganese .60%, nickel 3.70%, tungsten 7.50%, iron and incidentals, balance.

4. Glass molding apparatus which is substantially austenitic as cast and transforms to the martensitic state after submission to a heating cycle and comprising carbon .80% to 1.12%, chromium 12.00% to 15.00%, molybdenum .75% to 1.25%, silicon .75% to 1.50%, manganese .50% to 1.00%, nickel 2.50% to 4.50%, tungsten 6.00% to 8.00%, iron, balance.

ALFRED W. GREGG.
RAYMOND H. FRANK.